United States Patent
Bensmann

(10) Patent No.: US 11,401,028 B2
(45) Date of Patent: Aug. 2, 2022

(54) AERODYNAMIC AIRCRAFT COMPONENT

(71) Applicant: Airbus Operations GmbH, Hamburg (DE)

(72) Inventor: Stefan Bensmann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 293 days.

(21) Appl. No.: 16/567,609

(22) Filed: Sep. 11, 2019

(65) Prior Publication Data
US 2020/0079493 A1    Mar. 12, 2020

(30) Foreign Application Priority Data

Sep. 12, 2018 (DE) ..................... 10 2018 122 208.4

(51) Int. Cl.
*B64C 9/24*    (2006.01)
(52) U.S. Cl.
CPC ..................... *B64C 9/24* (2013.01)
(58) Field of Classification Search
CPC .... B64C 9/24; B64C 9/26; B64C 9/28; B64C 9/16; B64C 9/18; B64C 9/20
See application file for complete search history.

(56) References Cited

U.S. PATENT DOCUMENTS

| 3,109,613 | A | * | 11/1963 | Bryant | B64C 3/48 244/219 |
|---|---|---|---|---|---|
| 6,981,676 | B2 | | 1/2006 | Milliere | |
| 8,864,083 | B1 | * | 10/2014 | Shmilovich | B64C 9/24 244/215 |
| 9,242,718 | B2 | | 1/2016 | Wilson et al. | |
| 9,809,295 | B1 | * | 11/2017 | Bauer | B64C 1/14 |
| 10,017,239 | B2 | | 7/2018 | Neal et al. | |
| 2015/0251747 | A1 | | 9/2015 | Roe et al. | |
| 2016/0167765 | A1 | | 6/2016 | Barbieri | |
| 2016/0229526 | A1 | | 8/2016 | Hegenbart et al. | |

FOREIGN PATENT DOCUMENTS

EP    3 395 677 A1    10/2018

OTHER PUBLICATIONS

European Search Report for Application No. 19196669.6 dated Nov. 22, 2019.
German Search Report for Application No. 10 2018 122 208.4 dated May 29, 2019.

* cited by examiner

*Primary Examiner* — Timothy D Collins
*Assistant Examiner* — Justin Michael Heston
(74) *Attorney, Agent, or Firm* — Jenkins, Wilson, Taylor & Hunt, P.A.

(57) ABSTRACT

An aerodynamic aircraft component includes a fixed aerodynamic part, which has a first contact surface, and a movable aerodynamic part, which has a second contact surface and is mounted to the fixed aerodynamic part for movement relative to the fixed aerodynamic part between a first position, in which the first and second contact surfaces are spaced apart, and a second position, in which the second contact surface contacts the first contact surface. The fixed aerodynamic part includes one of a magnet device and a piece of magnetic material and the movable aerodynamic part includes the other of the magnet device and the piece of magnetic material. The magnet device and the piece of magnetic material are arranged such that a magnetic force between the magnet device and the piece of magnetic material urges the second contact surface in contact with the first contact surface.

14 Claims, 3 Drawing Sheets

AERODYNAMIC AIRCRAFT COMPONENT

CROSS-REFERENCE TO RELATED APPLICATION

This application claims priority to German Patent Application No. 10 2018 122 208.4 filed Sep. 12, 2018, the entire disclosure of which is incorporated by reference herein.

TECHNICAL FIELD

The disclosure herein relates to an aerodynamic aircraft component, such as a wing or a tail unit of an aircraft. A further aspect of the disclosure herein relates to an aircraft comprising such an aircraft component.

BACKGROUND

The aerodynamic aircraft component comprises a fixed aerodynamic part and a movable aerodynamic part. The fixed aerodynamic part and the movable aerodynamic part relate to parts that have an aerodynamic function for the aircraft and/or that have an aerodynamic surface that is in contact with the ambient flow. The fixed aerodynamic part has a first contact surface and the movable aerodynamic part has a second contact surface. The movable aerodynamic part is mounted to the fixed aerodynamic part such that it is movable relative to the fixed aerodynamic part between a first position where the first and second contact surfaces are spaced from one another, and a second position where the second contact surface contacts the first contact surface.

Such an aerodynamic aircraft component might be, for example, a wing wherein the fixed aerodynamic part is a fixed wing, the movable aerodynamic part is a slat, the first position corresponds to an extended position of the slat, the second position corresponds to a retracted position of the slat, the first contact surface is arranged at a leading edge of the fixed wing, and the second contact surface is arranged at a trailing edge of the slat.

Such wings are known in the art. Rigging of the slat with respect to the fixed wing might be a complicated and time-consuming procedure at the known wings. Usually, the angular position of the slat with respect to the fixed wing is adjusted with the aid of an eccentric bolt at a side link coupling a mount of the slat to a slat track. By angular adjustment of the eccentric bolt the angular orientation of the slat about a span direction is adjusted until the trailing edge of the slat presses against the leading edge of the fixed wing with a predefined pressure. This manual rigging process, however, is very laborious.

SUMMARY

An object of the disclosure herein is to provide an aerodynamic aircraft component that allows a simplified rigging process.

This object is achieved in that the fixed aerodynamic part comprises, preferably in the area of the first contact surface, one of a magnet device and a piece of magnetic material. The movable aerodynamic part comprises, preferably in the area of the second contact surface, the other of the magnet device and the piece of magnetic material. The magnet device and the piece of magnetic material are arranged such that a magnetic force between the magnet device and the piece of magnetic material urges, preferably presses with defined pressure, the second contact surface to the second position and in defined, predetermined contact with the first contact surface. In such a way, the manual rigging can be replaced or at least assisted by the magnetic force between the magnet device and the piece of magnetic material to press the first and second contact surfaces together.

In a preferred embodiment, the aerodynamic aircraft component is a wing, a vertical tail plane, or a horizontal tail plane. These are common aerodynamic aircraft components.

In a preferred embodiment, the movable aerodynamic part is a control surface, such as an aileron, a spoiler, a rudder, or an elevator. In case the aerodynamic aircraft component is a wing, the fixed aerodynamic part might be a fixed wing while the movable aerodynamic part might be a control surface in the form of an aileron or a spoiler. In case the aerodynamic aircraft component is a vertical tail plane (VTP), the fixed aerodynamic part might be a vertical stabilizer while the movable aerodynamic part might be a control surface in the form of a rudder. In case the aerodynamic aircraft component is a horizontal tail plane (HTP), the fixed aerodynamic part might be a horizontal stabilizer while the movable aerodynamic part might be a control surface in the form of an elevator.

In an alternative preferred embodiment, the movable aerodynamic part is a high lift surface. In case the aerodynamic aircraft component is a wing, the fixed aerodynamic part might be a fixed wing while the movable aerodynamic part might be a high lift surface in the form of a flap or a slat. Particularly in the case of flaps and slats the manual rigging process is extensive and desirable to be replaced by magnetic rigging.

In particular, it is preferred that the aerodynamic aircraft component is a wing, the fixed aerodynamic part is a fixed wing, the movable aerodynamic part is a slat, the first position corresponds to an extended position of the slat, the second position corresponds to a retracted position of the slat, the first contact surface is arranged at a leading edge of the fixed wing, and the second contact surface is arranged at a trailing edge of the slat. In the case of slats rigging is done such that the trailing edge of the slat is pressed against the leading edge of the fixed wing, which makes the manual rigging process extensive and desirable to be replaced by magnetic rigging.

It is further preferred that the magnet device is arranged at the leading edge of the fixed wing and the piece of magnetic material is arranged at the trailing edge of the slat. Such an arrangement is advantageous considering the spatial constraints at the trailing edge of the slat. However, it might also be preferred that the magnet device is arranged at the trailing edge of the slat and the piece of magnetic material is arranged at the leading edge of the fixed wing.

It is also preferred that the slat further comprises a main body comprising a leading edge of the slat. Between the trailing edge of the slat and the main body of the slat a resilient area is provided, so that the trailing edge of the slat due to the magnetic force may deform with respect to the main body by pivoting about the resilient area when the trailing edge is urged in contact with the leading edge of the fixed wing to establish contact between the first and second contact surfaces. The resilient area might be formed e.g. by a material with reduced stiffness and/or by a neck of material and/or by a spring. In such a way, only or mainly the trailing edge of the slat is deformed when the magnetic force urges the trailing edge of the slat against the leading edge of the fixed wing, instead of the entire slat being deformed as it usually the case with manual rigging.

According to a preferred embodiment, the magnet device and/or the piece of magnetic material extend continuously along the span extension of the movable aerodynamic part, preferably along the entire or at least along the essential span extension of the movable aerodynamic part. In such a way, a continuous and reliable magnetic force can be applied between the fixed and movable aerodynamic parts along the span extension of the movable aerodynamic part. The same might apply to resilient area, i.e. the resilient area might extend continuously along the span extension of the movable aerodynamic part.

According to an alternative preferred embodiment, the magnet device and/or the piece of magnetic material extend in an interrupted manner along the span extension of the movable aerodynamic part. I.e., the magnet device and/or the piece of magnetic material are provided only at discrete positions along the span extension of the movable aerodynamic part. In such a way, weight can be saved.

According to a further preferred embodiment, the magnet device is a permanent magnet or an electromagnet. The advantage of an electromagnet is that it might be switched on and off, and can thus be applied only when needed.

According to a further preferred embodiment, the magnet device and the piece of magnetic material are adapted such that the magnetic force is strong enough to inhibit air from passing between the fixed aerodynamic part and the movable aerodynamic part when the first and second contact surfaces are in contact. This is particularly advantageous for the slat where the trailing edge of the slat is ideally pressed against the leading edge of the fixed wing so that air is inhibited from passing therebetween, for aerodynamic reasons.

According to a further preferred embodiment, the magnet device and/or the piece of magnetic material have such a chord extension that the first and second contact surfaces remain in contact along a defined path when the movable aerodynamic part is moved out of the second position relative to the fixed aerodynamic part. In such a way, particularly in the case of a slat, air is inhibited from passing between the trailing edge of the slat and the leading edge of the fixed wing even when the slat is moved from the second position in the direction of the first position, for the length of the defined path.

A further aspect of the disclosure herein relates to an aircraft comprising the aircraft component according to any of the embodiments described above. The features and advantageous described in connection with the aircraft component apply vis-à-vis to the aircraft.

BRIEF DESCRIPTION OF THE DRAWINGS

A preferred embodiment of the disclosure herein is described hereinafter in more detail by drawings where.

DETAILED DESCRIPTION

Figure 1:
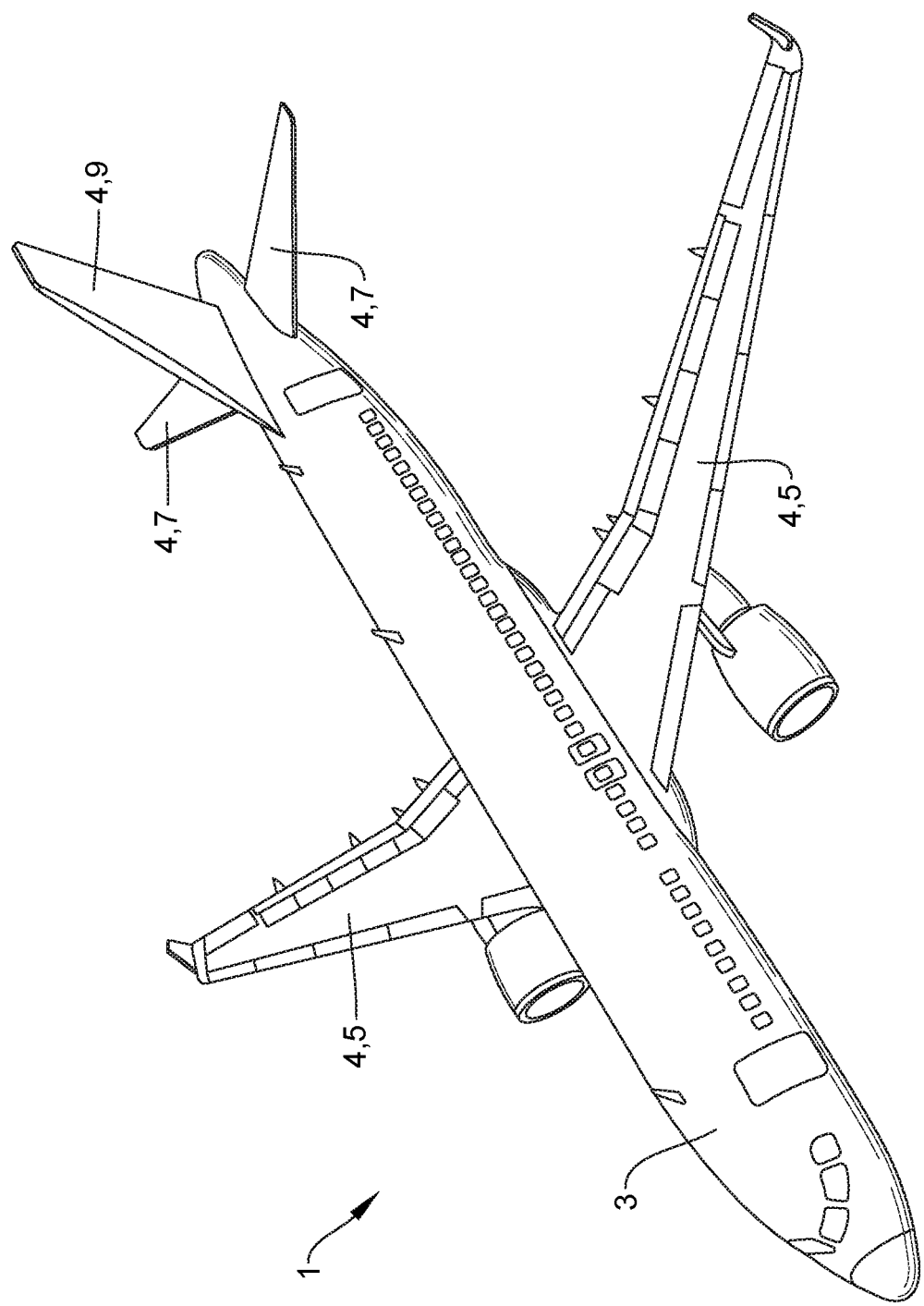
FIG. 1 is a perspective view of an aircraft according to the disclosure herein.

In FIG. 1 an aircraft 1 according to an embodiment of the disclosure herein is shown. The aircraft 1 comprises a fuselage 3 and several aerodynamic aircraft components 4 according to an embodiment of the disclosure herein. The aerodynamic aircraft components 4 are in the form of wings 5, a horizontal tail plane 7, and a vertical tail plane 9. A wing 5, 5' is described in more detail in connection with FIGS. 2 and 3.

Figure 2:
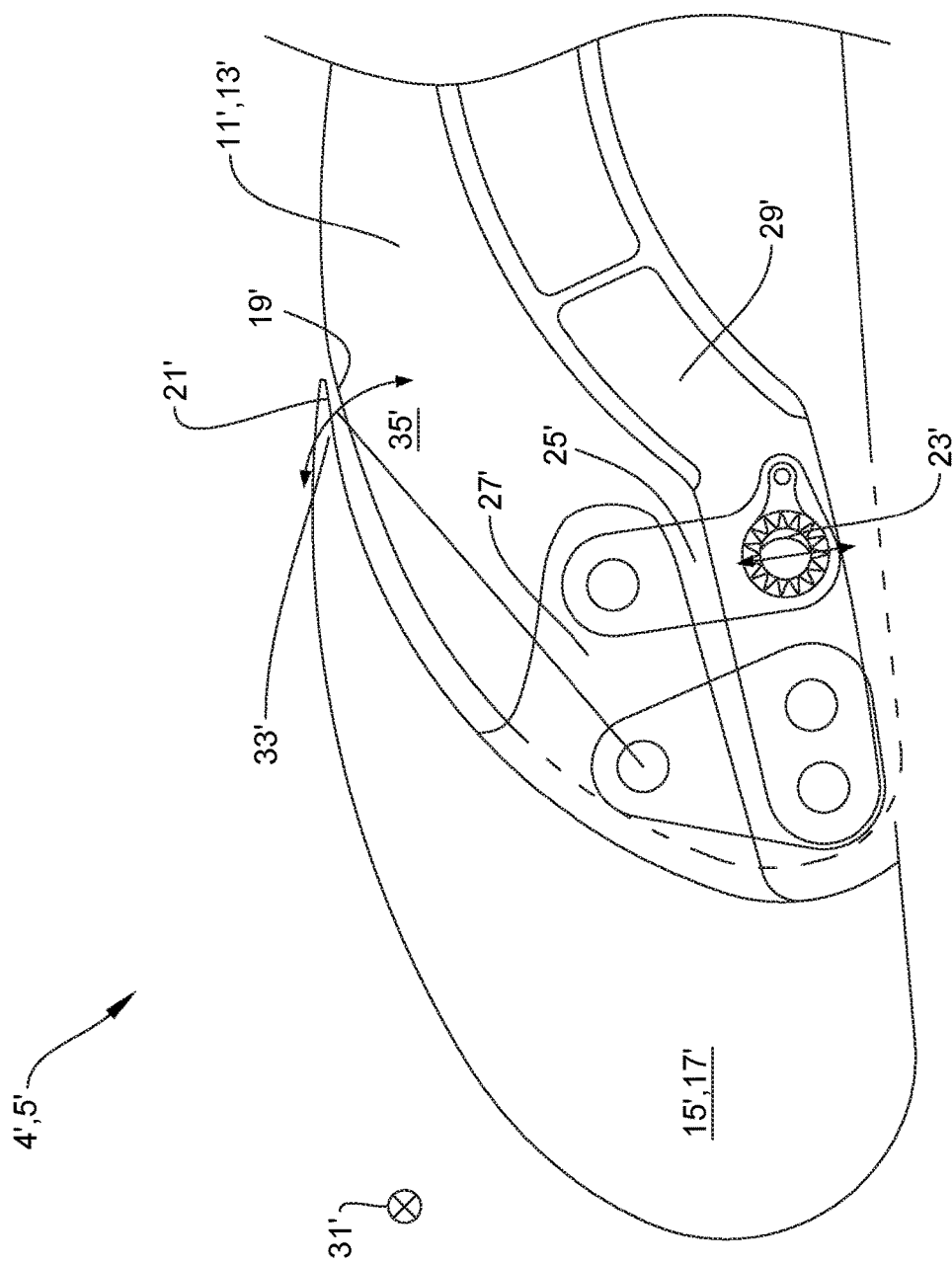
FIG. 2 is a cross-sectional view across the span direction of an aircraft component according to the prior art adapted for manual rigging.
Figure 3:
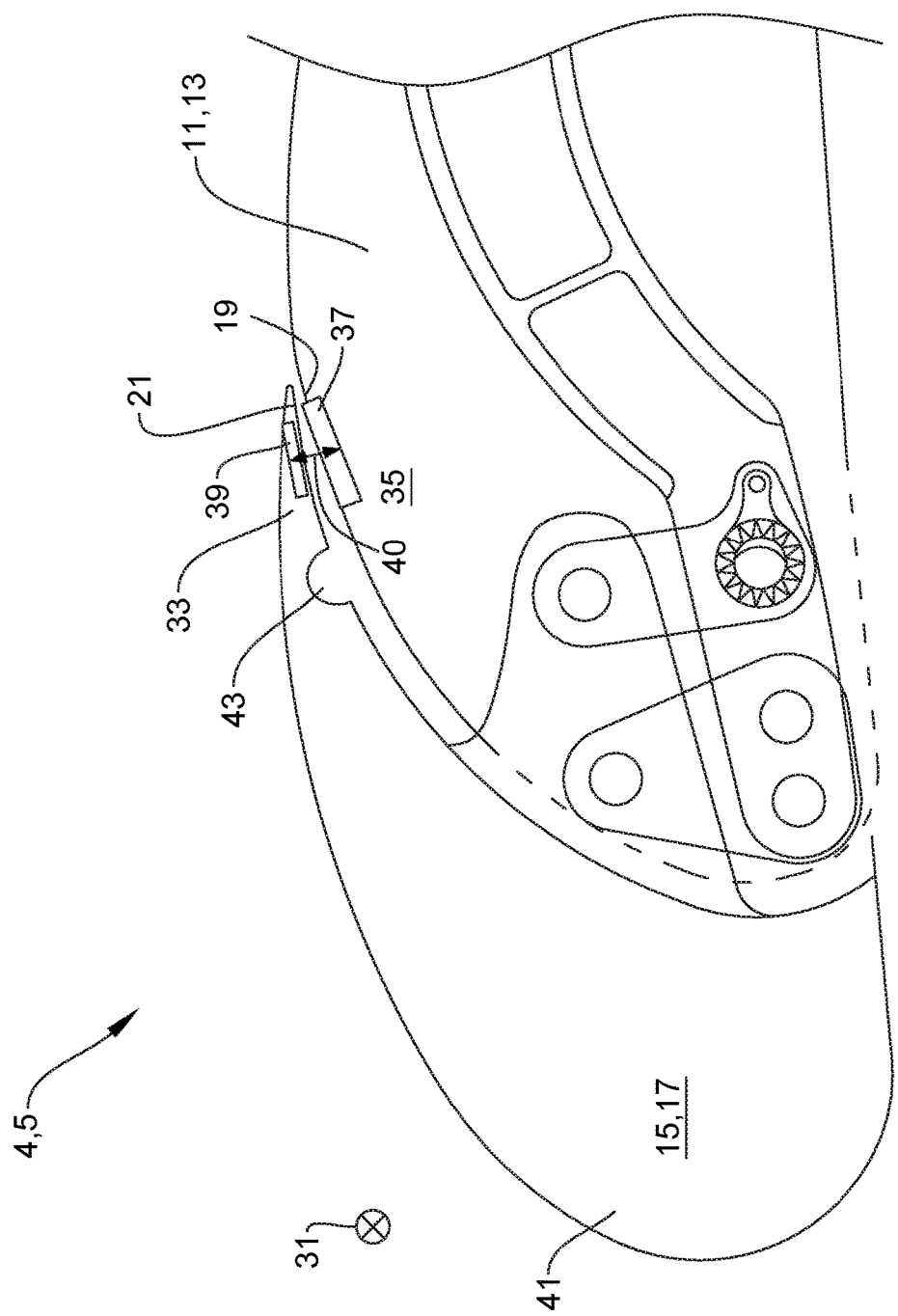
FIG. 3 is a cross-sectional view across the span direction of an aircraft component according to the disclosure herein adapted for magnetic rigging.

As shown in FIGS. 2 and 3, the aerodynamic aircraft component 4, 4' in the form of the wing 5, 5' comprises a fixed aerodynamic part 11, 11' in the form of a fixed wing 13, 13' and a movable aerodynamic part 15, 15' in the form a slat 17, 17'. The fixed wing 13, 13' has a first contact surface 19, 19' and the slat 17, 17' has a second contact surface 21, 21'. The slat 17, 17' is mounted to the fixed wing 13, 13' such that it is movable relative to the fixed wing 13, 13' between an extended position where the first and second contact surfaces 19, 19', 21, 21' are spaced from one another, and a retracted position where the second contact surface 21, 21' contacts the first contact surface 19, 19'.

FIG. 2 shows a prior art wing 5', wherein rigging of the slat 17' is done manually. Specifically, the angular position of the slat 17' with respect to the fixed wing 13' is adjusted with the aid of an eccentric bolt 23' at a side link 25' that couples a mount 27' of the slat 17' to a slat track 29' that is movable supported at the fixed wing 13'. By angular adjusting the eccentric bolt 23' the angular orientation of the slat 17' about a span direction 31' is adjusted until a trailing edge 33' of the slat 17' presses against the leading edge 35' of the fixed wing 13' with a predefined pressure.

FIG. 3 shows a wing 5 according to the disclosure herein, wherein rigging of the slat 17 is done magnetically. The fixed wing 13 comprises in the area of the first contact surface 19 a magnet device 37. The slat 17 comprises in the area of the second contact surface 21 a piece 39 of magnetic material. The magnet device 37 and the piece 39 of magnetic material are arranged such that a magnetic force 40 between the magnet device 37 and the piece 39 of magnetic material urges the second contact surface 21 in defined contact with the first contact surface 19. The magnet device 37 is arranged at the leading edge 35 of the fixed wing 13 and the piece 39 of magnetic material is arranged at the trailing edge 33 of the slat 17.

The slat 17 further comprises a main body 41, wherein between the trailing edge 33 of the slat 17 and the main body 41 of the slat 17 a resilient area 43 is provided, so that the trailing edge 33 of the slat 17 due to the magnetic force may deform with respect to the main body 41 by pivoting about the resilient area 43 when the trailing edge 33 is urged in contact with the leading edge 35 of the fixed wing 13 to establish contact between the first and second contact surfaces 19, 21. The resilient area 43 is formed by a neck of material.

The magnet device 37, the piece 39 of magnetic material and the resilient area 43 extend continuously along the span direction 31 extension of the slat 17. The magnet device 37 and the piece 39 of magnetic material are adapted such that the magnetic force 40 is strong enough to inhibit air from passing between the leading edge 35 of the fixed wing 13 and the trailing edge 33 of the slat 17 when the first and second contact surfaces 19, 21 are in contact. The magnet device 37 and the piece 39 of magnetic material have such an extension in a chord direction 45 that the first and second contact surfaces 19, 21 remain in contact along a defined path when the movable aerodynamic part 15 is moved out of the second position relative to the fixed aerodynamic part 11.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aerodynamic aircraft component comprising:
 a fixed aerodynamic part having a first contact surface and one of a magnet device and a piece of magnetic material;
 a movable aerodynamic part having a second contact surface and whichever of the magnet device and the piece of magnetic material that the fixed aerodynamic part does not comprise;
 wherein the movable aerodynamic part is mounted to the fixed aerodynamic part and is movable, relative to the fixed aerodynamic part, between a first position, in which the first and second contact surfaces are spaced from one another, and a second position, in which the second contact surface contacts the first contact surface;
 wherein the magnet device and the piece of magnetic material are arranged such that a magnetic force between the magnet device and the piece of magnetic material urges the second contact surface in defined contact with the first contact surface; and wherein the aircraft component is a wing, a vertical tail plane, or a horizontal tail plane.

2. The aircraft component according to claim 1, wherein the movable aerodynamic part is a control surface.

3. The aircraft component according to claim 1, wherein the movable aerodynamic part is a high lift surface.

4. The aircraft component according to claim 3, wherein:
 the aircraft component is a wing;
 the fixed aerodynamic part is a fixed wing;
 the movable aerodynamic part is a slat;
 the first position corresponds to an extended position of the slat and the second position corresponds to a retracted position of the slat;
 the first contact surface is arranged at a leading edge of the fixed wing; and
 the second contact surface is arranged at a trailing edge of the slat.

5. The aircraft component according to claim 4, wherein the magnet device is arranged at the leading edge of the fixed wing and the piece of magnetic material is arranged at the trailing edge of the slat.

6. The aircraft component according to claim 4, wherein the slat comprises:
 a main body;
 a resilient area between the trailing edge and the main body of the slat, so that the trailing edge of the slat is deformable with respect to the main body when the trailing edge of the slat is urged in contact with the leading edge of the fixed wing to establish contact between the first and second contact surfaces.

7. The aircraft component according to claim 1, wherein the magnet device or the piece of magnetic material extend continuously along a span extension of the movable aerodynamic part.

8. The aircraft component according to claim 1, wherein the magnet device or the piece of magnetic material extend in an interrupted manner along a span extension of the movable aerodynamic part.

9. The aircraft component according to claim 1, wherein the magnet device is a permanent magnet or an electromagnet.

10. The aircraft component according to claim 1, wherein the magnet device and the piece of magnetic material are adapted such that the magnetic force is strong enough to inhibit air from passing between the fixed aerodynamic part and the movable aerodynamic part when the first and second contact surfaces are in contact.

11. The aircraft component according to claim 1, wherein the magnet device and/or the piece of magnetic material have a chord extension such that the first and second contact surfaces remain in contact along a defined path when the movable aerodynamic part is moved out of the second position relative to the fixed aerodynamic part.

12. An aircraft comprising the aircraft component according to claim 1.

13. An aerodynamic aircraft component comprising:
 a fixed aerodynamic part having a first contact surface and one of a magnet device and a piece of magnetic material;
 a movable aerodynamic part having a second contact surface and whichever of the magnet device and the piece of magnetic material that the fixed aerodynamic part does not comprise;
 wherein the movable aerodynamic part is mounted to the fixed aerodynamic part and is movable, relative to the fixed aerodynamic part, between a first position, in which the first and second contact surfaces are spaced from one another, and a second position, in which the second contact surface contacts the first contact surface;
 wherein the magnet device and the piece of magnetic material are arranged such that a magnetic force between the magnet device and the piece of magnetic material urges the second contact surface in defined contact with the first contact surface; and
 wherein the movable aerodynamic part is a control surface or is a high lift surface.

14. The aircraft component according to claim 13, wherein the aircraft component is a wing, a vertical tail plane, or a horizontal tail plane.

* * * * *